United States Patent
Zhao

(10) Patent No.: US 12,047,247 B2
(45) Date of Patent: Jul. 23, 2024

(54) NETWORK DATA ANALYSIS METHOD, NETWORK DATA ANALYSIS FUNCTIONAL NETWORK ELEMENT AND COMMUNICATION SYSTEM

(71) Applicant: CHINA TELECOM CORPORATION LIMITED, Beijing (CN)

(72) Inventor: Song Zhao, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 0 days.

(21) Appl. No.: 18/020,521

(22) PCT Filed: May 12, 2021

(86) PCT No.: PCT/CN2021/093204
§ 371 (c)(1),
(2) Date: Feb. 9, 2023

(87) PCT Pub. No.: WO2022/033093
PCT Pub. Date: Feb. 17, 2022

(65) Prior Publication Data
US 2023/0269142 A1   Aug. 24, 2023

(30) Foreign Application Priority Data

Aug. 11, 2020 (CN) .......................... 202010800881.0

(51) Int. Cl.
H04L 41/14 (2022.01)
(52) U.S. Cl.
CPC ................... H04L 41/14 (2013.01)

(58) Field of Classification Search
CPC . H04L 41/14–149; H04L 43/02; H04L 43/06; H04L 43/08
See application file for complete search history.

(56) References Cited

U.S. PATENT DOCUMENTS

2020/0228419 A1   7/2020 Xu et al.
2020/0229085 A1*  7/2020 Hsu ................... H04W 52/0209
(Continued)

FOREIGN PATENT DOCUMENTS

WO    2019032968 A1    2/2019

OTHER PUBLICATIONS

Translated PCT written opinion PCT/CN2021/093204—Aug. 10, 2021.*

(Continued)

*Primary Examiner* — Boris D Grijalva Lobos
(74) *Attorney, Agent, or Firm* — Andrew M. Calderon; Calderon Safran & Wright, PC

(57) ABSTRACT

The present disclosure relates to the field of communications, and provides a network data analytics method, a network data analytics function (NWDAF) network element and a communication system. The NWDAF network element collects network data associated with an area of interest AOI, wherein the network data comprises energy-saving state information of a cell of the area of interest AOI. The network data associated with the area of interest AOI is analyzed by combining the energy-saving state information of the cell of the area of interest AOI, and the analysis result is output. The NWDAF network element can distinguish network data of the cell in the energy-saving state and the non-energy-saving state.

15 Claims, 2 Drawing Sheets

210, an NWDAF network element collects network data related to an area of interests AOI, which comprises energy-saving state information of cells of the AOI 220, the NWDAF network element performs analytics on the network data related to the AOI in combination with the energy-saving state information of the cells of the AOI, and outputs an analytics result

(56) References Cited

U.S. PATENT DOCUMENTS

| | | | |
|---|---|---|---|
| 2020/0252813 A1 | 8/2020 | Li et al. | |
| 2020/0314683 A1* | 10/2020 | Imran | H04W 16/08 |
| 2021/0037484 A1* | 2/2021 | Zhou | H04L 1/1854 |
| 2021/0195517 A1* | 6/2021 | Yang | H04W 52/0229 |
| 2023/0217360 A1* | 7/2023 | Karampatsis | H04W 24/10 370/329 |
| 2023/0269142 A1* | 8/2023 | Zhao | H04L 41/14 709/224 |

OTHER PUBLICATIONS

3GPP, "Solution for NWDAF assisted energy savings in FS_eNA_Ph2, S2-2004226", SA WG2 Meeting #139e (e-meeting), Jun. 12, 2020; sections 1-2, 6.x" (Year: 2020).*

International Search Report and Written Opinion issued on Aug. 10, 2021 in corresponding Application No. PCT/CN2021/093204; 8 pages.

Extended European Search Report issued on Nov. 9, 2023 in corresponding EP Application No. 21855149.7; 9 pages.

China Telecom et al: "Solution for NWDAF assisted energy saving in FS_eNA_Ph2", 3GPP Draft; S2-2004226, 3rd Generation Partnership Project (3GPP), Mobile Competence Centre; 650, Route Des Lucioles; F-06921 Sophia-Antipolis Cedex ; France vol. SA WG2, No. e-meeting; Jun. 1, 2020-Jun. 12, 2020 May 22, 2020 (May 22, 2020); 2 pages.

China Telecom et al: "New KI on NWDAF assisted energy saving in FS_eNA_Ph2", 3GPP Draft; S2-2003922, 3rd Generation Partnership Project (3GPP), Mobile Competence Centre; 650, Route Des Lucioles; F-06921 Sophia-Antipolis Cedex ; France vol. SA WG2, No. e-meeting ;Jun. 1, 2020-Jun. 12, 2020 May 22, 2020 (May 22, 2020); 4 pages.

5G; Architecture enhancements for 5G System (SGS) to support network data analytics services (3GPP TS 23.288 version 16.4.0 Release 16), ETSI Technical Specification, European Telecommunications Standards Institute (ETSI), 650, Route Des Lucioles; F-06921 Sophia-Antipolis; France—vol. 3GPP SA, No. VI6.4.0 Jul. 27, 2020 (Jul. 27, 2020), 68 pages.

* cited by examiner 210, an NWDAF network element collects network data related to an area of interests AOI, which comprises energy-saving state information of cells of the AOI 220, the NWDAF network element performs analytics on the network data related to the AOI in combination with the energy-saving state information of the cells of the AOI, and outputs an analytics result

NETWORK DATA ANALYSIS METHOD, NETWORK DATA ANALYSIS FUNCTIONAL NETWORK ELEMENT AND COMMUNICATION SYSTEM

CROSS-REFERENCE TO RELATED APPLICATIONS

The present disclosure is a U.S. National Stage Application under 35 U.S.C. § 371 of international Patent Application No. PCT/CN2021/093204, filed on May 12, 2021, which is based on and claims the priority to the Chinese patent application No. 202010800881.0 filed on Aug. 11, 2020, the disclosure of which are hereby incorporated into this disclosure by reference in its entirety.

TECHNICAL FIELD

This disclosure relates to the field of communications, and in particular, to a network data analytics method, a network data analytics function (NWDAF) network element, and a communication system.

BACKGROUND

In a 5G ($5^{th}$ Generation) system, NWDAF is introduced for network data analytics. The NWDAF can collect and analyze network data, generate and output analytics results, for assisting a network element that makes a request for analytics in selecting a related policy.

The NWDAF can, for example, collect network data of quality of service flow granularity related to a quality of service (QoS for short) profile for a specific application, from a network function (NF) network element and an operation administration and maintenance (OAM) device of a 5G core network, or can collect network data of user granularity related to the QoS profile from the OAM device. The QoS flow granularity is less than the user granularity. The network data of QoS flow granularity includes, for example, information such as application identification and packet delay, but is not limited thereto. The network data of user granularity includes, for example, information such as RSRP (Reference Signal Receiving Power), RSRQ (Reference Signal Receiving Quality), and SNR (Signal-to-Noise Ratio), SINR (Signal to Interference plus Noise Ratio), but is not limited thereto. The network data of user granularity in the OAM device is measured by a user in a cell.

The data, after being collected, can be used by the NWDAF to perform analytics such as observed service experience.

SUMMARY

Some embodiments of the present disclosure provide a network data analytics method, comprising:
- a network data analytics function NWDAF network element collecting network data related to an area of interests AOI, the network data related to the AOI comprising energy-saving state information of cells of the AOI; and
- the NWDAF network element performing analytics on the network data related to the AOI in combination with the energy-saving state information of the cells of the AOI, and outputting an analytics result.

In some embodiments, the energy-saving state information of the cells of the AOI acquired by the NWDAF network element from an operation administration and maintenance OAM device.

In some embodiments, the energy-saving state information of the cells of the AOI comprises: a list of energy-saving cells of the AOI, a list of cells of the AOI with an energy-saving state, or information on a proportion of a number of the cells in the energy-saving state in the AOI to a total number of all the cells an the AOI.

In some embodiments, the NWDAF network element performing analytics on the network data related to the AOI comprises: the NWDAF network element distinguishing between first network data related to the AOI corresponding to an energy-saving state and second network data related to the AOI corresponding to a non-energy-saving state in combination with the energy-saving state information of the cells of the AOI, and performing analytics on the network data related to the AOI according to a distinguishing result.

In some embodiments, the NWDAF network element performing analytics on the network data related to the AOI comprises:
- the NWDAF network element ignoring the first network data related to the AOI corresponding to the energy-saving state, performing analytics on the second network data related to the AOI corresponding to the non-energy-saving state, and outputting a first analytics result;
- or, the NWDAF network element performing analytics on the first network data related to the AOI corresponding to the energy-saving state and the second network data related to the AOI corresponding to the non-energy-saving state respectively, and outputting a second analytics result and a third analytics result respectively;
- or, the NWDAF network element ignoring the second network data related to the AOI corresponding to the non-energy-saving state, performing analytics on the first network data related to the AOI corresponding to the energy-saving state, and outputting a sixth analytics result.

In some embodiments, the NWDAF network element performing analytics on the network data related to the AOI comprises: the NWDAF network element correcting the first network data related to the AOI corresponding to the energy-saving state, performing analytics on the second network data related to the AOI corresponding to the non-energy-saving state and the corrected first network data related to the AOI corresponding to the energy-saving state, and outputting a fourth analytics result.

In some embodiments, the NWDAF network element performing analytics on the network data related to the AOI comprises: the NWDAF network element performing analytics on the network data related to the AOI, and outputting a fifth analytics result and a confidence of the fifth analytics result, wherein the confidence is determined by the NWDAF network element according to the energy-saving state information of the cells of the AOI.

In some embodiments, the NWDAF network element collecting the network data related to the AOI comprises:
- the NWDAF network element collecting the network data related to the AOI according to an analytics requirement provided by a network function NF network element, the analytics requirement comprising the AOI; and the NWDAF network element outputting the analytics result comprises: the NWDAF network element outputting the analytics result to the NF network element.

In some embodiments, the analytics comprises business service experience analytics.

In some embodiments, the AOI comprises a list of a group of cells or a list of a group of tracking areas, each tracking area comprising at least one cell.

Some embodiments of the present disclosure provide a network data analytics function network element, comprising: a memory; and a processor coupled to the memory, the processor being configured to perform, based on instructions stored in the memory, the network data analytics method of any of the embodiments.

Some embodiments of the present disclosure provide a network data analytics function network element, comprising:
- a network data collection unit configured to collect network data related to an area of interests AOI, the network data related to the AOI comprising energy-saving state information of cells of the AOI; and
- a network data analytics unit configured to perform analytics on the network data related to the AOI in combination with the energy-saving state information of the cells of the AOI, and output an analytics result.

In some embodiments, the network data collection unit is configured to acquire the energy-saving state information of the cells of the AOI from an operation administration and maintenance OAM device; and the network data analytics unit is configured to distinguish between first network data related to the AOI corresponding to an energy-saving state and second network data related to the AOI corresponding to a non-energy-saving state, in combination with the energy-saving state information of the cells of the AOI, and perform analytics on the network data related to the AOI according to a distinguishing result.

Some embodiments of the present disclosure provide a communication system, comprising:
- the network data analytics function NWDAF network element described above;
- an operation administration and maintenance OAM device configured to provide energy-saving state information of cells of an area of interests AOI to the NWDAF network element; and
- a network function NF network element configured to provide an analytics requirement to the NWDAF network element, the analytics requirement comprising the AOI, and receive an analytics result returned by the NWDAF network element.

Some embodiments of the present disclosure provide a non-transitory computer-readable storage medium storing a computer program which, when executed by a processor, implements the steps of the network data analytics method according to any of the embodiments.

BRIEF DESCRIPTION OF THE DRAWINGS

The drawings that need to be used in the description of embodiments or the related art will be briefly described below. The present disclosure can be more clearly understood from the following detailed description, which proceeds with reference to the accompanying drawings.

It is apparent that the drawings in the following description are merely examples of the present disclosure and that other drawings can also be derived by those of ordinary skill in the art without paving creative efforts.

DETAILED DESCRIPTION

The technical solutions in the embodiments of the present disclosure will be clearly and completely described below with reference to the drawings in the embodiments of the present disclosure.

Unless specifically stated otherwise, similar descriptions such as "first" and "second" in this disclosure are used for distinguishing between different objects, not for indicating a size, sequence or the like.

The inventor found that whether a cell is in an energy-saving state is completely transparent to user equipment. In other words, the user equipment, in measurement in the cell, does not know whether the cell where it is located is in the energy-saving state. However, whether the cell is in the energy-saving state brings huge differences in work indices of the cell such as radio frequency. Therefore, whether a service cell or a neighboring cell is in the energy-saving state actually brings a great difference in network data of user granularity that is measured by a user in the service cell. When an NWDAF collects the network data of user granularity, network data of the cell in the energy-saving state and network data in a non-energy-saying state, between which there are huge differences, are mixed together and hard to distinguish, so that when the NWDAF performs analytics according to the data indiscriminately, accuracy of analytics results will be affected.

In an embodiment of the present disclosure, an NWDAF network element collects related network data comprising energy-saving state information of the cell, can distinguish between the network data of the cell in the energy-saving state and the network data in the non-energy-saving state, and can perform analytics on the related network data in combination with the energy-saving state information of the cell, thereby improving the accuracy of the analytics results.

Figures 1, 2:
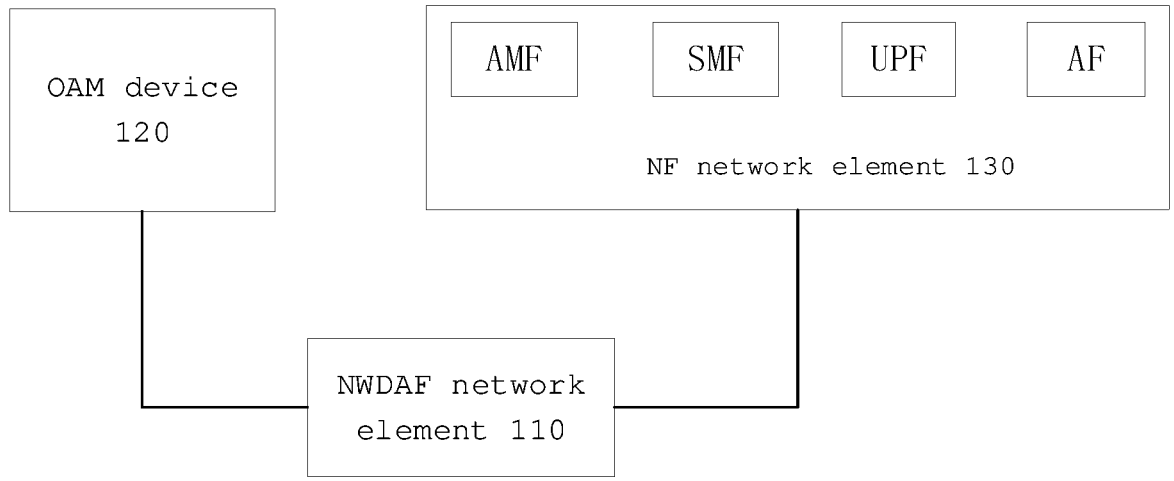
FIG. 1 illustrates a schematic diagram of a communication system according to some embodiments of the present disclosure.
FIG. 2 illustrates a flow diagram of a network data analytics method according to some embodiments of the present disclosure.

FIG. 1 illustrates a schematic diagram of a communication system according to some embodiments of the present disclosure.

As shown in FIG. 1, the communication system of this embodiment comprises: an NWDAF network element 110, an OAM device 120, an NF network element 130, and etc. There is a service interface between the NWDAF network element 110 and the OAM device 120. There is a communication interface between the NWDAF network element 110 and each NF network element 130.

The NWDAF network element 110 is configured to collect network data from the GAM device 120, or the NF network element 130, etc., and acquire energy-saving state information of cells of an area of interests (AOI) from the GAM device 120, perform analytics on the collected network data in combination with the energy-saving state information of the cells, and output an analytics result.

The OAM device 120 is configured to provide, to the NWDAF network element 110, the energy-saving state information of the cells of the AOI, and other network data for the analytics when necessary. For example, the GAP device 120 provides, to the NWDAF network element 110, network data of user granularity, for example, information such as RSRP, RSRQ, SNR, and SINR, but not limited thereto.

The NF network element 130 comprises, for example: an access and mobility management function (AMP), a session management function (SMF), a user plane function (UPF), an application function (AF), and the like. Each NF network element 130 is configured to provide, to the NWDAF network element, the network data for the analytics, such as network data of quality of service flow granularity, for example, information such as application identification and packet delay, but not limited thereto. Each NF network element 130 is configured to provide an analytics requirement, which comprises the area of interests, and receive the analytics result returned by the NWDAF network element 110, to make a related business decision based on the analytics result, and the like.

Any one NF network element 130 can provide the analytics requirement to the NWDAF network element 110, and the NWDAF network element 110 collects the network data from one or more NF network elements 130 or the OAM device 120 based on the analytics requirement. The NF network element 130 that provides the analytics requirement and the NF network element 130 that provides the network data for the analytics can be the same or different.

FIG. 2 illustrates a flow diagram of a network data analytics method according to some embodiments of the present disclosure.

As shown in FIG. 2, the method of this embodiment comprises: steps 210 to 220.

In the step 210, an NWDAF network element collects network data related to an area of interests AOI, which comprises energy-saving state information of cells of the AOI, and other network data for analytics, for example, the above-listed network data of user granularity, network data of quality of service flow granularity, and the like.

The NWDAF network element collecting the network data related to the area of interests AOI comprises: the NWDAF network element acquiring, through a service interface between the NWDAF network element and an OAM device, the energy-saving state information of the cells of the AOI from the OAM device, and simultaneously collecting other network data related to the AOI for the analytics from related network elements, such as AMF, SMF, UPF, AF or the OAM device, according to an analytics requirement provided by an NF network element, the analytics requirement comprising the AOI.

The AOI comprises a list of a group of cells or a list of a group of tracking areas, each tracking area comprising at least one cell, typically a plurality of cells.

The energy-saving state information of the cells of the AOI comprises: a list of energy-saving cells of the AOI, a list of cells of the AOI with an energy-saving state, or information on proportion of a number of the cells in the energy-saving state in the AOI to a total number of all the cells in the AOI, or energy-saving state information of the cells in another form.

In the step 220, the NWDAF network element performs analytics on the network data related to the AOI, for example, business service experience analytics, in combination with the energy-saving state information of the cells of the AOI, and outputs an analytics result to the NF network element that provides the analytics requirement.

The business service experience analytics includes, for example: statistical analytics on business service experiences of historical data, predictive analytics on business service experiences in the future based on the historical data, and the like.

A method of the NWDAF network element performing analytics on the network data related to the AOI in combination with the energy-saving state information of the cells of the AOI will be described later.

The NWDAF network element collects the related network data comprising the energy-saving state information of the cells, can distinguish between network data of the cells in the energy-saving state and network data in a non-energy-saving state, and perform analytics on the related network data in combination with the energy-saving state information of the cells, thereby improving the accuracy of the analytics result.

In some embodiments, the NWDAF network element performing analytics on the network data related to the AOI in combination with the energy-saving state information of the cells of the AOI comprises: the NWDAF network element distinguishing between first network data related to the AOI corresponding to the energy-saving state and second network data related to the AOI corresponding to the non-energy-saving state in combination with the energy-saving state information of the cells of the AOI, and performing analytics on the network data related to the AOI according to a distinguishing result, thereby improving the accuracy of the analytics result.

In other embodiments, the NWDAF network element performing analytics on the network data related to the AOI in combination with the energy-saving state information of the cells of the AOI comprises: the NWDAF network element ignoring the first network data related to the AOI corresponding to the energy-saving state, performing analytics on the second network data related to the AOI corresponding to the non-energy-saving state, and outputting a first analytics result.

For example, in the predictive analytics on business service experiences in the future based on the historical data, when a machine learning model is trained using the historical data as training data, historical first network data is excluded from the training data according to the energy-saving state information of the cells, and the machine learning model is trained by using historical second network data as the training data, to obtain a predictive analytics model for the business service experiences. The machine learning model can be, for example, a regression model, etc.

Since the training data are comparatively accurate, the finally trained predictive analytics model can perform accurate predictive analytics on the business service experiences.

In other embodiments, the NWDAF network element performing analytics on the network data related to the AOI in combination with the energy-saving state information of the cells of the AOI comprises: the NWDAF network element performing analytics on the first network data related to the AOI corresponding to the energy-saving state and the second network data related to the AOI corresponding to the non-energy-saving state respectively, and outputting a second analytics result and a third analytics result respectively.

For example, the NWDAF network element performs statistical analytics on RSRP related to the AOI corresponding to the energy-saving state, and simultaneously performs statistical analytics on RSRP related to the AOI corresponding to the non-energy-saving state, and outputs an RSRP statistical analytics result in the energy-saving state and an RSRP statistical analytics result in the non-energy-saving state respectively, thereby improving the accuracy of the analytics result. In addition, comparison analytics can be also performed on the RSRP statistical analytics result in the energy-saving state and the RSRP statistical analytics result in the non-energy-saving state.

In other embodiments, the NWDAF network element performing analytics on the network data related to the AOI in combination with the energy-saving state information of the cells of the AOI comprises: the NWDAF network element correcting the first network data related to the AOI corresponding to the energy-saving state, performing analytics on the second network data related to the AOI corresponding to the non-energy-saving state and the corrected first network data related to the AOI corresponding to the energy-saving state, and outputting a fourth analytics result.

For example, the NWDAF network element corrects the RSRP related to the AOI corresponding to the energy-saving state, for example, if it is known that RSRP decreases by 30% in the energy-saving state, the RSRP measured by a terminal in the energy-saving state is divided by 70% as a correction result. The statistical analytics is performed on the corrected RSRP and the RSRP related to the AOI corresponding to the non-energy-saving state, and the RSRP statistical analytics result is output, thereby improving the accuracy of the analytics result.

In other embodiments, the NWDAF network element performing analytics on the network data related to the AOI in combination with the energy-saving state information of the cells of the AOI comprises: the NWDAF network element performing analytics on the network data related to the AOI, and outputting a fifth analytics result and a confidence of the fifth analytics result, wherein the confidence is determined by the NWDAF network element according to the energy-saving state information of the cells of the AOI.

For example, assuming that the AOI includes 6 cells, if all the cells are in the non-energy-saving state when the network data is collected, a confidence of the analytics result obtained by the analytics of the NWDAF network element on the collected network data is 100%, and if 1 cell is in the energy-saving state when the network data is collected, the confidence of the analytics result obtained by the analytics of the NWDAF network element on the collected network data will decrease to less than 100%, for example, 85%. Generally, when the network data is collected, the more cells are in the energy-saving state, the less the confidence of the analytics result. Therefore, the provider of the analytics requirement is enabled to judge reliability of the analytics result according to the confidence, thereby determining a degree of dependence on the analytics result in the related business decision.

In other embodiments, the NWDAF network element performing analytics on the network data related to the AOI in combination with the energy-saving state information of the cells of the AOI comprises: the NWDAF network element ignoring the second network data related to the AOI corresponding to the non-energy-saving state, performing analytics on the first network data related to the AOI corresponding to the energy-saving state, and outputting a sixth analytics result.

For example: the NWDAF network element separately performs statistical analytics on an RSRP or other quality of service indices related to the AOI corresponding to the energy-saving state, and outputs a statistical analytics result of the RSRP or other quality of service indices in the energy-saving state, for an analytics service subscriber to judge a degree of change in the quality of service in the energy-saving state, thereby improving the accuracy of the analytics result.

Figure 3:
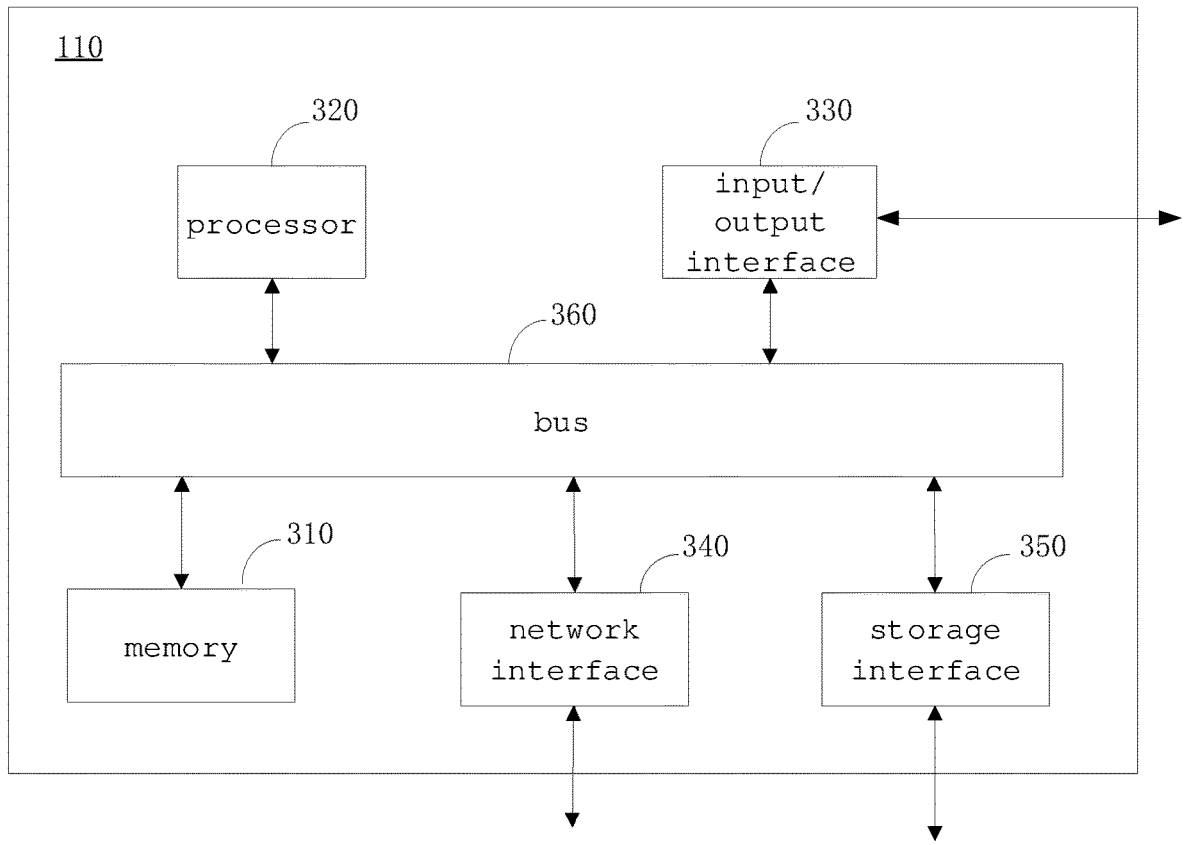
FIG. 3 illustrates a schematic diagram of an NWDAF network element according to some embodiments of the present disclosure.

FIG. 3 illustrates a schematic diagram of an NWDAF network element according to some embodiments of the present disclosure.

As shown in FIG. 3, the NWDAF network element 110 of this embodiment comprises: a memory 310 and a processor 320 coupled to the memory 310, the processor 320 being configured to perform, based on instructions stored in the memory 310, the network data analytics method in any of the foregoing embodiments.

The memory 310 can comprise, for example, a system memory, a fixed non-volatile storage medium, and the like. The system memory has thereon stored, for example, an operating system, an application program, a boot loader, other programs, and the like.

The NWDAF network element 110 can further comprise an input/output interface 330, a network interface 340, a storage interface 350, and the like. These interfaces 330, 340, 350 and the memory 310 and the processor 320 can be connected via a bus 360, for example. The input/output interface 330 provides a connection interface for input/output devices such as a display, a mouse, a keyboard, and a touch screen. The network interface 340 provides a connection interface for various networking devices. The storage interface 350 provides a connection interface for external storage devices such as a SD card and a USB flash disk.

Figure 4:
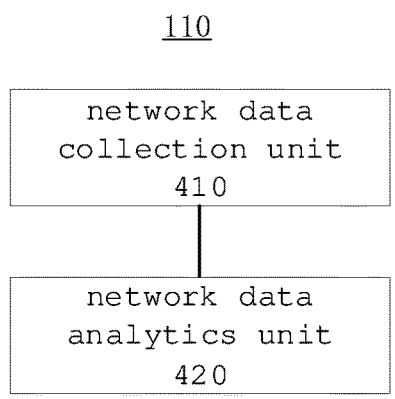
FIG. 4 illustrates a schematic diagram of an NWDAF network element according to other embodiments of the present disclosure.

FIG. 4 shows a schematic diagram of an NWDAF network element according to other embodiments of the present disclosure.

As shown in FIG. 4, the NWDAF network element 110 of this embodiment comprises: units 410 to 420.

A network data collection unit 410 is configured to collect network data related to an AOI, the network data related to the AOI comprising energy-saving state information of cells of the AOI. The energy-saving state information of the cells of the AOI is acquired by the NWDAF network element from an operation administration and maintenance OAM device.

A network data analytics unit 420 is configured to perform analytics on the network data related to the AOI in combination with the energy-saving state information of the cells of the AOI, and output an analytics result.

In some embodiments, the network data collection unit 410 is configured to acquire the energy-saving state information of the cells of the AOI from the OAM device; and the network data analytics unit 420 is configured to distinguish between first network data related to the AOI corresponding to an energy-saving state and second network data related to the AOI corresponding to a non-energy-saving state, in combination with the energy-saving state information of the cells of the AOI, and perform analytics on the network data related to the AOI according to a distinguishing result.

In some embodiments, the network data analytics unit 420 is configured to ignore the first network data related to the AOI corresponding to the energy-saving state, perform analytics on the second network data related to the AOI corresponding to the non-energy-saving state, and output a first analytics result.

In some embodiments, the network data analytics unit 420 is configured to perform analytics on the first network data related to the AOI corresponding to the energy-saving state and the second network data related to the AOI corresponding to the non-energy-saving state respectively, and output a second analytics result and a third analytics result respectively.

In some embodiments, the network data analytics unit 420 is configured to correct the first network data related to the AOI corresponding to the energy-saving state, perform analytics on the second network data related to the AOI corresponding to the non-energy-saving state and the corrected first network data related to the AOI corresponding to the energy-saving state, and output a fourth anal result.

In some embodiments, the network data analytics unit 420 is configured to perform analytics on the network data related to the AOI, and output a fifth analytics result and a confidence of the fifth analytics result, wherein the confidence is determined by the NWDAF network element according to the energy-saving state information of the cells of the AOI.

In some embodiments, the network data analytics unit 420 is configured to ignore the second network data related to the AOI corresponding to the non-energy-saving state, perform analytics on the first network data related to the AOI corresponding to the energy-saving state, and output a sixth analytics result.

Some embodiments of the present disclosure provides a non-transitory computer-readable storage medium storing a computer program which, when executed by a processor, implements the steps of the network data analytics method of any of the embodiments.

It should be appreciated by those skilled in the art that the embodiments of the present disclosure can be provided as the method, system, or computer program product. Accordingly, the present disclosure can take a form of an entire hardware embodiment, an entire software embodiment, or an embodiment combining software and hardware aspects. Furthermore, the present disclosure can take a form of a computer program product implemented on one or more non-transitory computer-readable storage media (including, but not limited to, a disk memory, CD-ROM, optical memory, etc.) having computer program code embodied therein.

The present disclosure is described with reference to flow diagrams and/or block diagrams of the method, device (system), and computer program product according to the embodiments of the present disclosure. It should be understood that each flow and/or block in the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing device to produce a machine, such that the instructions, which are executed by the processor of the computer or other programmable data processing devices, create means for implementing the functions specified in one or more flows of the flow diagrams and/or one or more blocks of the block diagrams.

These computer program instructions can also be stored in a computer-readable memory that can guide a computer or other programmable data processing devices to work in a specific manner, such that the instructions, which are stored in the computer-readable memory, produce an article of manufacture including instruction means which implement the functions specified in one or more flows of the flow diagrams and/or one or more blocks of the block diagrams.

These computer program instructions can also be loaded onto a computer or other programmable data processing devices to cause a series of operation steps to be performed on the computer or other programmable devices to produce a computer-implemented process, such that the instructions, which are executed on the computer or other programmable devices, provide steps for implementing the functions specified in one or more flows of the flow diagrams and/or one or more blocks of the block diagrams.

The above content is merely the preferred embodiments of the present disclosure and not used for limiting the present disclosure, and any modification, equivalent replacement, improvement, and the like made within the spirit and principle of the present disclosure should be included in the scope of protection of the present disclosure

What is claimed is:

1. A network data analytics method, comprising:
a network data analytics function NWDAF network element collecting network data related to an area of interests AOI, the network data related to the AOI comprising energy-saving state information of cells of the AOI; and
the NWDAF network element performing analytics on the network data related to the AOI in combination with the energy-saving state information of the cells of the AOI, and outputting an analytics result,
wherein the NWDAF network element performing analytics on the network data related to the AOI comprises:
the NWDAF network element distinguishing between first network data related to the AOI corresponding to an energy-saving state and second network data related to the AOI corresponding to a non-energy-saving state in combination with the energy-saving state information of the cells of the AOI, and performing analytics on the network data related to the AOI according to a distinguishing result; and
a network function NF network element receiving an analytics result returned by the NWDAF network element, and selecting a related policy according to the analytics result.

2. The method according to claim 1, wherein
the energy-saving state information of the cells of the AOI is acquired by the NWDAF network element from an operation administration and maintenance OAM device.

3. The method according to claim 1, wherein
the energy-saving state information of the cells of the AOI comprises: a list of energy-saving cells of the AOI, a list of cells of the AOI with an energy-saving state, or information on proportion of a number of the cells in the energy-saving state in the AOI to a total number of all the cells in the AOI.

4. The method according to claim 1, wherein the NWDAF network element performing analytics on the network data related to the AOI comprises:
the NWDAF network element ignoring the first network data related to the AOI corresponding to the energy-saving state, performing analytics on the second network data related to the AOI corresponding to the non-energy-saving state, and outputting a first analytics result;
or, the NWDAF network element performing analytics on the first network data related to the AOI corresponding to the energy-saving state and the second network data related to the AOI corresponding to the non-energy-saving state respectively, and outputting a second analytics result and a third analytics result respectively;
or, the NWDAF network element ignoring the second network data related to the AOI corresponding to the non-energy-saving state, performing analytics on the first network data related to the AOI corresponding to the energy-saving state, and outputting a sixth analytics result.

5. The method according to claim 1, wherein the NWDAF network element performing analytics on the network data related to the AOI comprises:

the NWDAF network element correcting the first network data related to the AOI corresponding to the energy-saving state, performing analytics on the second network data related to the AOI corresponding to the non-energy-saving state and the corrected first network data related to the AOI corresponding to the energy-saving state, and outputting a fourth analytics result.

6. The method according to claim 1, wherein the NWDAF network element performing analytics on the network data related to the AOI comprises:
the NWDAF network element performing analytics on the network data related to the AOI, and outputting a fifth analytics result and a confidence of the fifth analytics result,
wherein the confidence is determined by the NWDAF network element according to the energy-saving state information of the cells of the AOI.

7. The method according to claim 1, wherein
the NWDAF network element collecting the network data related to the AOI comprises:
the NWDAF network element collecting the network data related to the AOI according to an analytics requirement provided by a network function NF network element, the analytics requirement comprising the AOI; and
the NWDAF network element outputting the analytics result comprises: the NWDAF network element outputting the analytics result to the NF network element.

8. The method according to claim 1, wherein
the analytics comprises business service experience analytics;
or, the AOI comprises a list of a group of cells or a list of a group of tracking areas, each tracking area comprising at least one cell.

9. A non-transitory computer-readable storage medium storing a computer program which, when executed by a processor, implements the steps of the network data analytics method according to claim 1.

10. The storage medium according to claim 9, wherein the computer program implements the steps of the network data analytics method comprising:
ignoring the first network data related to the AOI corresponding to the energy-saving state, performing analytics on the second network data related to the AOI corresponding to the non-energy-saving state, and outputting a first analytics result;
or, performing analytics on the first network data related to the AOI corresponding to the energy-saving state and the second network data related to the AOI corresponding to the non-energy-saving state respectively, and outputting a second analytics result and a third analytics result respectively;
or, ignoring the second network data related to the AOI corresponding to the non-energy-saving state, performing analytics on the first network data related to the AOI corresponding to the energy-saving state, and outputting a sixth analytics result;
or, correcting the first network data related to the AOI corresponding to the energy-saving state, performing analytics on the second network data related to the AOI corresponding to the non-energy-saving state and the corrected first network data related to the AOI corresponding to the energy-saving state, and outputting a fourth analytics result;
or, performing analytics on the network data related to the AOI, and outputting a fifth analytics result and a confidence of the fifth analytics result, wherein the confidence is determined by the NWDAF network element according to the energy-saving state information of the cells of the AOI.

11. A network data analytics function network element, comprising:
a memory; and
a processor coupled to the memory, the processor being configured to perform, based on instructions stored in the memory, the network data analytics method, comprising:
collecting network data related to an area of interests AOI, the network data related to the AOI comprising energy-saving state information of cells of the AOI;
performing analytics on the network data related to the AOI in combination with the energy-saving state information of the cells of the AOI, and outputting an analytics result to a network function NF network element to assist the NF network element in selecting a strategy; and
an NWDAF network element performing analytics on the network data related to the AOI which comprises:
the NWDAF network element distinguishing between first network data related to the AOI corresponding to an energy-saving state and second network data related to the AOI corresponding to a non-energy-saving state in combination with the energy-saving state information of the cells of the AOI, and performing analytics on the network data related to the AOI according to a distinguishing result.

12. The network data analytics function network element according to claim 11, wherein the performing analytics on the network data related to the AOI comprises:
distinguishing between first network data related to the AOI corresponding to an energy-saving state and second network data related to the AOI corresponding to a non-energy-saving state in combination with the energy-saving state information of the cells of the AOI, and performing analytics on the network data related to the AOI according to a distinguishing result.

13. The network data analytics function network element according to claim 12, wherein the performing analytics on the network data related to the AOI comprises:
ignoring the first network data related to the AOI corresponding to the energy-saving state, performing analytics on the second network data related to the AOI corresponding to the non-energy-saving state, and outputting a first analytics result;
or, performing analytics on the first network data related to the AOI corresponding to the energy-saving state and the second network data related to the AOI corresponding to the non-energy-saving state respectively, and outputting a second analytics result and a third analytics result respectively;
or, ignoring the second network data related to the AOI corresponding to the non-energy-saving state, performing analytics on the first network data related to the AOI corresponding to the energy-saving state, and outputting a sixth analytics result;
or, correcting the first network data related to the AOI corresponding to the energy-saving state, performing analytics on the second network data related to the AOI corresponding to the non-energy-saving state and the corrected first network data related to the AOI corresponding to the energy-saving state, and outputting a fourth analytics result;
or, performing analytics on the network data related to the AOI, and outputting a fifth analytics result and a confidence of the fifth analytics result, wherein the confidence is determined by the NWDAF network element according to the energy-saving state information of the cells of the AOI.

14. A communication system, comprising:
the network data analytics function NWDAF network element comprising:
a memory; and a processor coupled to the memory, the processor being configured to perform, based on instructions stored in the memory, the network data analytics method, comprising:
collecting network data related to an area of interests AOI, the network data related to the AOI comprising energy-saving state information of cells of the AOI; and
performing analytics on the network data related to the AOI in combination with the energy-saving state information of the cells of the AOI, and outputting an analytics result, wherein the NWDAF network element performing analytics on the network data related to the AOI comprises: the NWDAF network element distinguishing between first network data related to the AOI corresponding to an energy-saving state and second network data related to the AOI corresponding to a non-energy-saving state in combination with the energy-saving state information of the cells of the AOI, and performing analytics on the network data related to the AOI according to a distinguishing result;
an operation administration and maintenance OAM device configured to provide energy-saving state information of cells of an area of interests AOI to the NWDAF network element; and
a network function NF network element configured to provide an analytics requirement to the NWDAF network element, the analytics requirement comprising the AOI, receive an analytics result returned by the NWDAF network element, and select a related policy according to the analytics result,
wherein a service interface is between the NWDAF network element and the OAM device, and a communication interface is between the NWDAF network element and the NF network element.

15. The communication system according to claim 14, wherein the processor of the network data analytics function network element configured to:
ignore the first network data related to the AOI corresponding to the energy-saving state, perform analytics on the second network data related to the AOI corresponding to the non-energy-saving state, and output a first analytics result;
or, perform analytics on the first network data related to the AOI corresponding to the energy-saving state and the second network data related to the AOI corresponding to the non-energy-saving state respectively, and output a second analytics result and a third analytics result respectively;
or, ignore the second network data related to the AOI corresponding to the non-energy-saving state, perform analytics on the first network data related to the AOI corresponding to the energy-saving state, and output a sixth analytics result;
or, correct the first network data related to the AOI corresponding to the energy-saving state, perform analytics on the second network data related to the AOI corresponding to the non-energy-saving state and the corrected first network data related to the AOI corresponding to the energy-saving state, and output a fourth analytics result;
or, perform analytics on the network data related to the AOI, and output a fifth analytics result and a confidence of the fifth analytics result, wherein the confidence is determined by the NWDAF network element according to the energy-saving state information of the cells of the AOI.

* * * * *